United States Patent [19]

Freeman et al.

[11] Patent Number: 5,277,470
[45] Date of Patent: Jan. 11, 1994

[54] TAPERED INTRUSION BEAM FOR REINFORCING A VEHICLE DOOR

[75] Inventors: Richard B. Freeman, Oxford; Stephen E. Rawe, Clarkston, both of Mich.

[73] Assignee: The Budd Company, Troy, Mich.

[21] Appl. No.: 964,374

[22] Filed: Oct. 21, 1992

[51] Int. Cl.⁵ .............................................. B60J 5/04
[52] U.S. Cl. .................................. 296/146.6; 296/188; 188/371; 188/377
[58] Field of Search ........................... 296/146; 49/502; 188/371, 377

[56] References Cited

U.S. PATENT DOCUMENTS

| | | | |
|---|---|---|---|
| 3,300,901 | 1/1967 | Eckel | 49/502 |
| 3,700,076 | 10/1972 | Forsting et al. | 188/377 |
| 3,782,036 | 1/1974 | Clark et al. | 49/501 |
| 3,829,149 | 8/1974 | Stevens | 296/189 |
| 3,868,141 | 2/1975 | Johnson | 296/146 C |
| 4,090,734 | 5/1978 | Inami et al. | 296/146 C |
| 4,306,381 | 12/1981 | Presto | 49/502 |
| 4,369,608 | 1/1983 | Miura et al. | 296/146 C |
| 4,378,394 | 3/1983 | Miura et al. | 428/113 |
| 4,378,395 | 3/1983 | Asoshina et al. | 296/189 |
| 4,434,580 | 3/1984 | Engelsberger et al. | 49/502 |
| 4,708,390 | 11/1987 | Poletyn et al. | 296/188 |
| 4,861,097 | 8/1989 | Wycech | 296/188 |
| 4,866,883 | 9/1989 | Brown et al. | 49/502 |
| 4,901,500 | 2/1990 | Wycech | 296/146 C |
| 4,919,473 | 4/1990 | Laimighofer et al. | 296/188 |
| 4,978,562 | 12/1990 | Wycech | 296/146 C |

Primary Examiner—Robert R. Song
Attorney, Agent, or Firm—Harness, Dickey & Pierce

[57] ABSTRACT

An intrusion beam structure for reinforcing a vehicle door includes an elongated member adapted to be attached to a surface of the inner panel of a door frame that is substantially parallel to the axis defined by the elongated member. The elongated member includes first and second end portions interdisposed by a middle portion. The end portions are substantially identical and each taper away from the middle portion. In a first embodiment, the elongated member is unitarily formed and has a substantially circular cross-section. In a second embodiment, the elongated member includes first and second bar portions which substantially traverse the entire length of the elongated member and are disposed substantially parallel to each other. The first and second bar portions are separated by an intermediate structure.

17 Claims, 3 Drawing Sheets

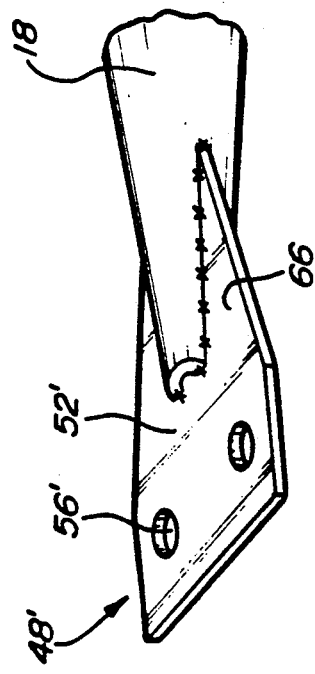
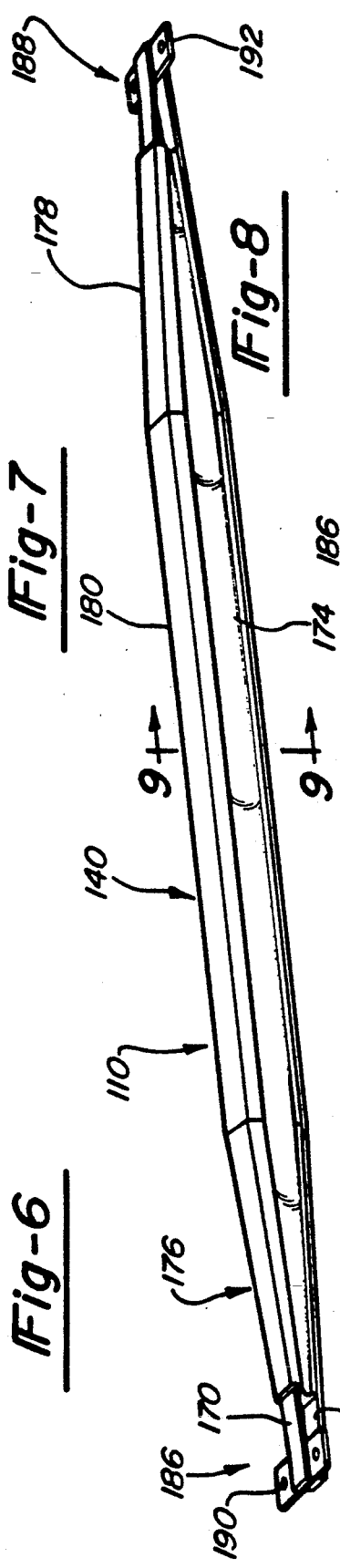
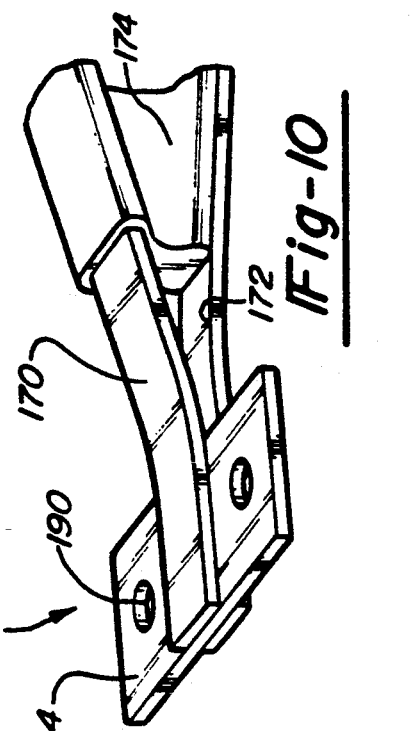
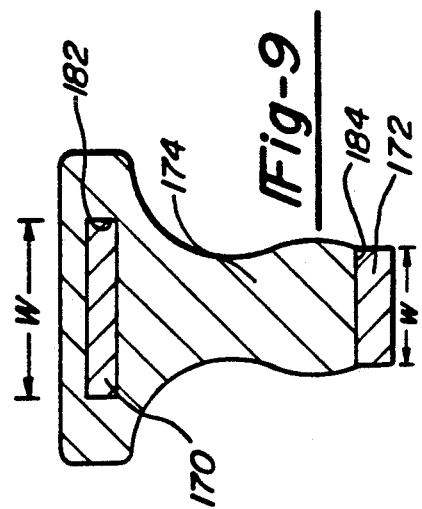

TAPERED INTRUSION BEAM FOR REINFORCING A VEHICLE DOOR

BACKGROUND OF THE INVENTION

1. Technical Field

The present invention relates generally to vehicle occupant protection. More particularly, the present invention relates to an intrusion beam for reinforcing a vehicle door.

2. Discussion

Conventional vehicle doors typically are equipped with a rigid intrusion beam structure to protect vehicle occupants from injuries resultant from a side impact. This practice has generally proven successful in meeting current side impact Federal Motor Vehicle Safety Standards (FMVSS) which require a static test. In the current test, which is technically a quasi-static test, a ram is slowly forced into the side of a stationary vehicle. The vehicle door is required to meet minimum specified force-deflection characteristics. There are three requirements of the current test—initial crush, intermediate crush and peak crush. The peak crush is a minimum specified load requirement that must be achieved during the first 18 inches that the ram is advanced into the side of the vehicle.

Extensive testing done with an anthropomorphic test device (ATD), otherwise known as a crash dummy, has indicated that the current standard is not entirely representative of actual side impact collisions, and further that compliance with the current standard is not necessarily sufficient to protect vehicle occupants. During a vehicle side impact collision, as with most dynamic collisions involving one object substantially stationary with respect to the direction of impact, two impacts actually occur. When a first car, the striking car, collides with a second car, the struck car, a first impact occurs immediately. Milliseconds later, the second impact occurs in which the occupant and the interior of the vehicle door collide. Importantly, it is this second impact which directly inflicts injury upon the vehicle occupant.

As a result of the current standards' inability to sufficiently replicate the results of a vehicle side impact collision, an amendment to the side impact standards (FMVSS 214), adopted Nov. 2, 1990, requires a dynamic test. In this test, a moving barrier, simulating a striking vehicle, impacts a stationary vehicle at a speed of 33.5 miles per hour. Thoracic and pelvic acclerations taken from the ATD are monitored. The accelerations are then compared with specified maximums provided by the amended standard. The FMVSS dynamic requirements will be in addition to the static, or quasi-static, requirements of the current standard. Dynamic standards are scheduled to be gradually implemented begin in 1994.

The applicability of the two tests is listed immediately below.

| VEHICLE TYPE | STATIC | DYNAMIC |
|---|---|---|
| PASSENGER CARS | CURRENT | 10% 09-01-1993 |
|  |  | 25% 09-01-1994 |
|  |  | 40% 09-01-1995 |
|  |  | 100% 09-01-1996 |
| LIGHT TRUCKS | 90% 09-01-1993 | NOT CURRENTLY |
|  | 100% 09-01-1993 | PLANNED |

With the retention of the current test, coupled with the pending adoption of the dynamic test, it is critical that intrusion beam structures be designed so that a vehicle door is capable of meeting both standards. It is recognized by those skilled in the art that dynamic test results can be greatly improved through the addition of padding and minor structural changes to the belt-line region of the door. Accordingly, a need exists for intrusion beam designs which meet static requirements while also permitting sufficient space for such padding and structural changes necessary to improve dynamic test results.

Historically the most difficult portion of the static test is the initial crush requirement. During the test the loading ram is placed in contact with the outer panel which may be located ½ inch or more from the intrusion beam. The load does not increase appreciably until the ram contacts the intrusion beam. Therefore, the initial stiffness of the door beam is critical.

The stiffness of an intrusion beam structure is controlled by the modulus of elasticity of the material and the moment of inertia of the beam cross section. The modulus of elasticity, being material dependent is necessarily limited by known methods of manufacture. The moment of inertia is dependent on section geometry. The most efficient way to increase the moment of inertia is to increase cross-sectional depth. However, the cross-sectional depth is limited by internal door packaging requirements and component weight restrictions. Increasing the section depth also results in higher beam stresses for a given displacement. This leads to an early yield point in the load vs. displacement curve, and is potentially detrimental to an intrusion beam's performance.

Heretofore, many intrusion beams having the practical cross-sections capable of meeting the initial stiffness requirement of the static test result in yield or collapse after only a few inches of ram penetration. During the static test, after the initial crush, an intrusion beam makes a transition from that of a bending member to a tensile member. In the tensile mode, significantly large tensile loads are transferred to the ends of the intrusion beam.

Several devices used to reinforce vehicle doors from the impact of a side collision are known. U.S. Pat. No. 3,868,141 to Johnson relates to elongated members disposed vertically between the exterior panels of a vehicle door. U.S. Pat. No. 3,700,076 to Forsting et al. relates to an energy absorbing band anchored on the door end walls. U.S. Pat. No. 4,328,642, relates to a stamped intrusion beam attached to the inner door frame of a vehicle.

None of the above-discussed devices is without its problems. While these known devices may have proven satisfactory for applications in the past, their efficiency, cost, methods of manufacture, and occupant protection capacity can be improved. Further, none of the above-discussed devices was designed to meet the requirements of the dynamic test.

SUMMARY OF THE INVENTION

In accordance the teachings of the present invention an intrusion beam for a vehicle door having a door frame is provided. The intrusion beam comprises an elongated member which includes first and second end portions interdisposed between a middle portion. The intrusion beam further comprises means for mounting the elongated member to the door frame. Preferably, the middle portion of the elongated member has a uniform cross section, while the first and second end portions each taper away from the middle portion.

In a first embodiment, the elongated member is unitarily formed and has a substantially circular cross-section. The elongated member includes first and second end portions interdisposed by a middle portion. The first and second end portions are substantially identical and each taper away from the middle portion. Means for mounting the elongated member to the door frame are provided by first and second mounting portions which are adapted to be permanently attached to surfaces of the door frame which are substantially parallel to the elongated member.

In a second embodiment, the elongated member of the intrusion beam of the present invention includes first and second bar portions which traverse substantially the entire length of the elongated member. The first and second bar portions are disposed substantially parallel to each other for a substantial portion thereof and are separated by an intermediate structure. The elongated member includes first and second end portions interdisposed between a middle portion, the first and second end portions each tapering away from the middle portion. Preferably, the intermediate member includes an aperture extending lengthwise therethrough, one of the first and second bar portions being disposed therein.

BRIEF DESCRIPTION OF THE DRAWINGS

The various advantages of the present invention will become apparent from analysis of the following written specification, the accompanying drawings and the appended claims in which:

FIG. 6 is a first alternative mounting member for the intrusion beam of the first embodiment of the present invention shown in FIG. 1;

FIG. 7 is a second alternative mounting member for the intrusion beam of the first embodiment of the present invention shown in FIG. 1;

FIG. 8 is a perspective view of a second embodiment of an intrusion beam constructed in accordance with the teachings of the present invention;

FIG. 9 is a cross sectional view taken along lines 9—9 of FIG. 8; and

FIG. 10 is a perspective view of the mounting member of FIG. 8.

DESCRIPTION OF THE PREFERRED EMBODIMENTS

Figure 1:
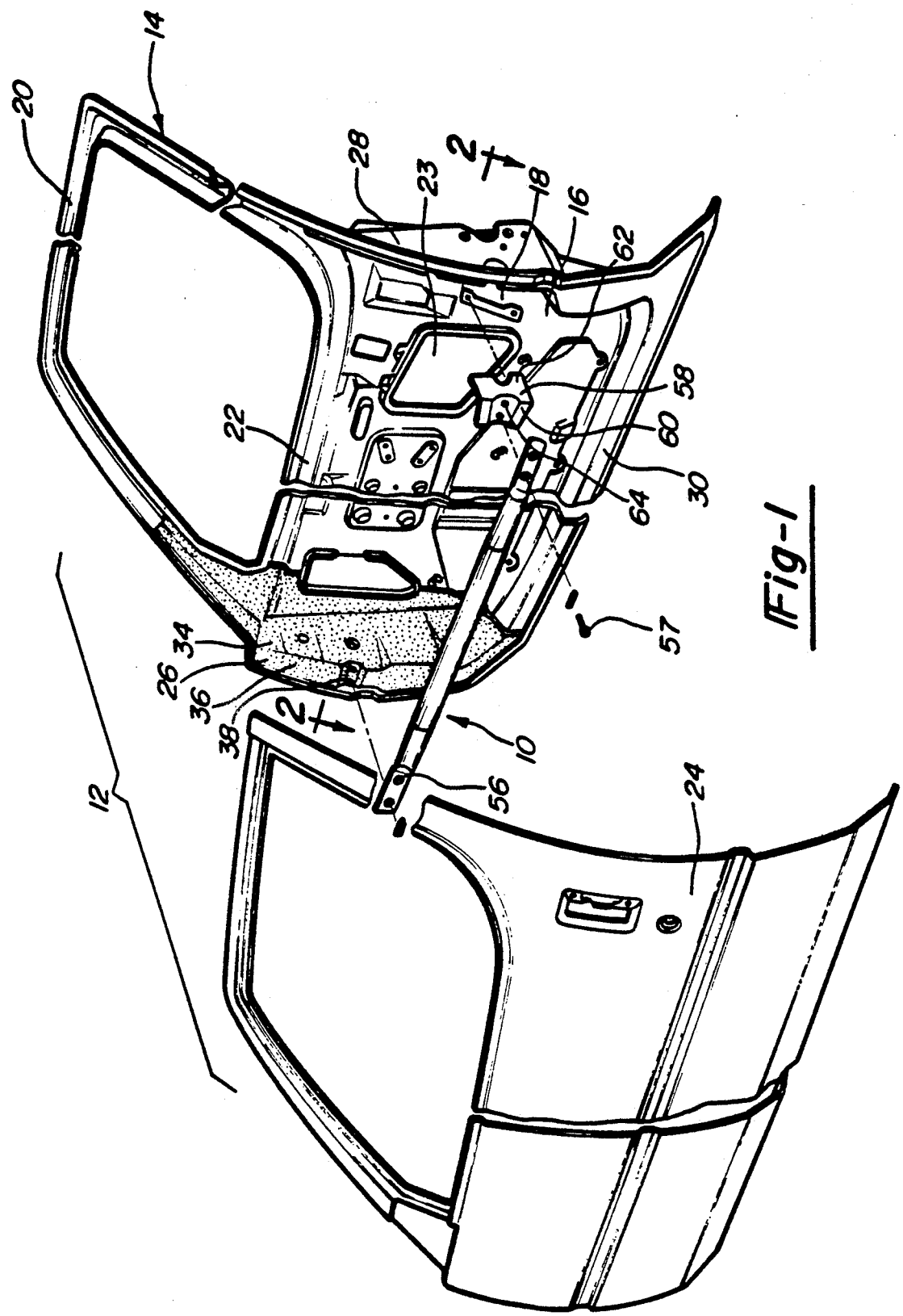
FIG. 1 is an exploded perspective view of a door structure made in accordance with the teachings of the present invention.
Figure 2:
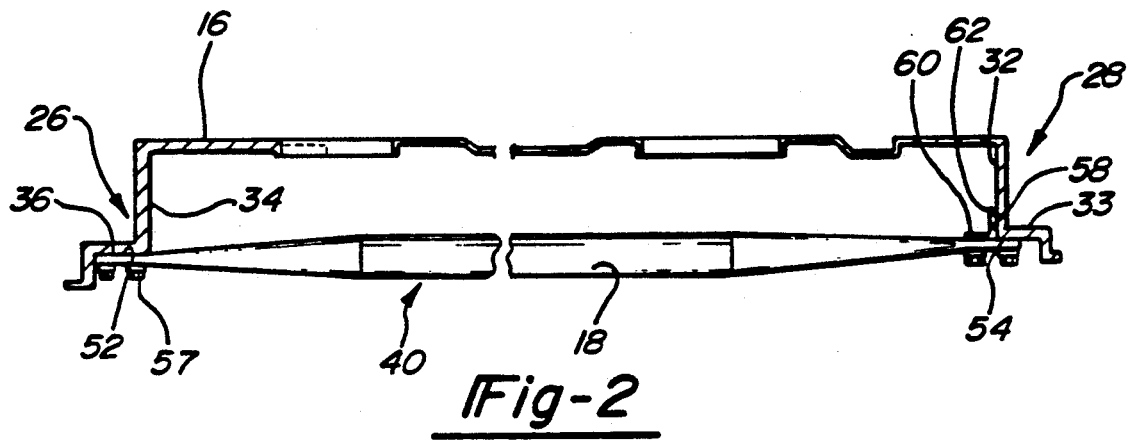
FIG. 2 is a simplified cross-sectional view taken along lines 2—2 of FIG. 1 with the intrusion beam structure mounted in position.

As generally shown in FIG. 1, the intrusion beam structure 10 of the present invention is designed to be mounted on in a vehicle door 12, thereby reinforcing the door 12 and protecting the occupants of the vehicle. The door 12 into which the present invention is to be incorporated may be of traditional construction having a door frame 14 having an inner panel 16. The inner panel 16 is formed by stamping galvanized sheet metal to define a shape corresponding to that of the door opening in the vehicle in which it will be used. The inner panel 16 is formed to include a lower generally rectangular portion 18 and an upper generally trapezoidal portion 20 generally defining a window opening. The intersection of the upper and lower portions is commonly referred to as the belt-line 22.

Below the belt-line 22, the inner panel 16 is typically provided with a plurality of openings 23 for access to internal mechanisms such as window regulators and door latches (not shown) which are operatively disposed within the vehicle door 12 between the inner panel 16 and an outer panel 24. Also below the belt-line, the inner panel 16 includes front and rear lower leg portions 26 and 28 (alternatively referred to as laterally-extending side walls) connected by a bottom leg portion 30. The rear leg portions 28 is generally L-shaped in cross section and includes a side wall portion 32 extending substantially perpendicular to the lower rectangular portion 18. The front leg portion 26 is formed to include a side wall portion 34 extending substantially perpendicular to the lower rectangular portion 18, and a mounting wall portion 36 dependent therefrom. The mounting wall portion 36 is substantially perpendicular to the lower portion 18.

The mounting wall portion 36 of the inner panel 16 is adapted to cooperate with the intrusion beam for mounting an end thereto. In this regard, the mounting wall portion 36 is formed to include a recess adapted to receive a first end of the intrusion beam structure 10, the details of which will become more apparent below.

The outer panel 24 of the door is preferably formed of a sheet molded compound (SMC) and is adapted for attachment to the inner panel 16. In this regard, the outer panel 24 includes an outer surface which is exposed to the environment and inner surface adapted to mate with the inner panel 16. The door 12 is designed to be attached between two vertical posts (not shown) in a vehicle. Much of the focus of this invention is directed towards the construction of intrusion beam structure 10 and its mounting to the door Turning to FIGS. 1-5, a first preferred embodiment of the present invention is illustrated. The intrusion beam structure 10 includes an elongated member 40 which has first and second end portions 42, 44 interdisposed between a middle portion 46. The middle, or intermediate, portion 46 is substantially cylindrical and has an inner diameter d and an outer diameter D. In the exemplary embodiment illustrated in the drawings, the middle portion 46 of the preferred embodiment of the present invention has a substantially uniform cross section.

The first and second end portions 42, 44 are substantially identical and circular in cross section, each having an inner diameter d' and an outer diameter D'. The first and second end portions 42, 44 each taper away from the middle portion 46, the degree of taper preferably being constant. Hence, the elongated member 40 has inner and outer diameters cumulatively designated d, d' and D, D', respectively. The outer diameter D, D' of the elongated member 40 varies independently from the inner diameter d, d' of the elongated member. Accordingly, the wall thickness of the first and second end portions 42, 44 is not constant. It will be appreciated by those skilled in the art that the inner diameter d' of the end portions 42, 44 may decrease as the distance from the middle portion 46 increases or may remain constant depending on particular strength requirements.

The first and second end portions 42, 44 each have a length approximately equal to one-half of the length of the middle portion 46. While this dimensional relationship is not particularly critical, it will be noted that the first and second end portions 42, 44 are structurally significant, as opposed to ends adapted solely for mounting.

Further, in the preferred embodiment, the first and second end portions 42, 44 are unitarily formed with the middle portion 46. However, it will be appreciated by those skilled in the art that the first and second end portions 42, 44 can alternatively be attached to the middle portion 46 by any suitable well-known technique, including welding or bonding.

The intrusion beam structure 10 of the present invention further includes means for mounting the elongated member 40 to the door frame 14. The means for mounting the elongated member 40 to the door frame 14 comprises first and second mounting portions 48, 50. The first and second mounting portions 48, 50 include first and second substantially planar surfaces 52, 54, respectively. Each planar surface 52, 54 is disposed substantially parallel to the elongated member 40 and is adapted to mount to surfaces of the door 12 which are substantially parallel to the axis defined by the elongated member 40. Such mounting improves load transfer to the door frame 14, and ultimately to the vehicle frame.

Figure 3:
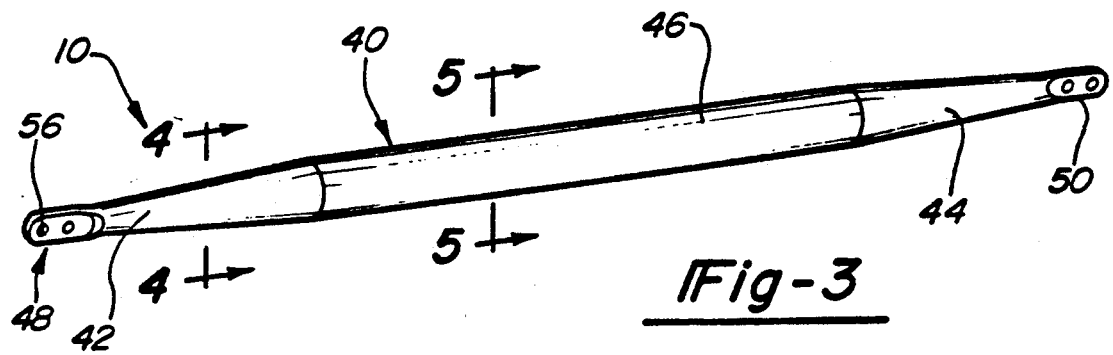
FIG. 3 is a perspective view of the intrusion beam of FIG. 1.
Figure 4:
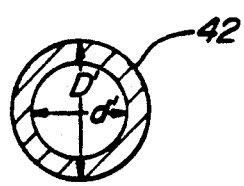
FIG. 4 is a cross sectional view taken along lines 4—4 of FIG. 3.
Figure 5:
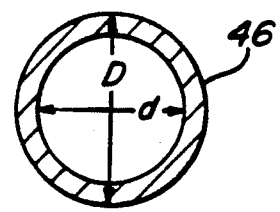
FIG. 5 is a cross sectional view taken along lines 5—5 of FIG. 3.

In the preferred embodiment, the first and second mounting members 48, 50 are unitarily formed with the remainder of the elongated member 40. As shown in FIG. 3, the mounting members 48, 50 can be formed by a pressing operation. That is, a part of both the first and second end portions 42, 44 are pressed so as to form the first and second planar surfaces 52, 54. Apertures 56 are provided in each mounting member 48, 50 through which bolts 58 may pass in order to fasten the elongated member 40 to the door frame 14.

The first mounting member 48 is formed to be cooperatively received within the recess 38 formed in the mounting wall 36. The second mounting member 50 is mounted to mounting wall 33. In the preferred embodiment, a metal bracket 58 can be provided for additional reinforcement. The bracket 58 is generally L-shaped, having a first leg 60 and a second leg 62. The first leg 60 preferably includes apertures 64 which align with the apertures 56 formed in the second mounting member 50. The second leg 62 is adapted to be welded, or otherwise suitably fastened, to side wall portion 32.

Referring to FIG. 6, illustrated is a first alternative mounting member 48' for the intrusion beam 10 of the first embodiment of the present invention. In this embodiment, the mounting member 48' comprises a metal plate 66 welded to the elongated member 18. The first alternative mounting member 48' includes a substantially planar surface 52' disposed substantially parallel to the elongated member 40 and is adapted to mount to a surface parallel to the axis defined by the elongated member 40. Similarly to mounting member 48, mounting member 48' is formed to include apertures 56'.

Referring to FIG. 7, illustrated is a second alternative mounting member 48" for the intrusion beam of the first embodiment of the present invention. In this embodiment, the mounting member 48" is stamped to include a substantially planar surface 52" disposed substantially parallel to the elongated member 40 and adapted to mount to a surface parallel to the axis defined by the elongated member 40. The mounting member 48" is welded to the door frame 14.

Multiple parameters within the elongated member 40 of the first preferred embodiment can be independently altered in order to achieve desired strength and load characteristics. Such parameters include but are not limited to choice of steel, length of the middle portion 46 as compared to the end portions 42, 44, inside and outside diameters d, D of the middle portion 46, and inside and outside diameters d', D' of the end portions 42, 44. The particular relative dimensioning shown herein is merely exemplary.

Turning to FIGS. 8–10, illustrated is a second embodiment of an intrusion beam structure 110 constructed in accordance with the teachings of the present invention. Elements common to the embodiments of FIGS. 1–5 are designated with reference numerals increased by 100. The intrusion beam structure 110 of the second preferred embodiment comprises an elongated member 140 having first and second bar portions 170, 172. The first and second bar portions 170, 172 traverse substantially the entire length of the elongated member 140 and are disposed substantially parallel to one another for a significant portion thereof. The first and second bar portions 170, 172 are separated by an intermediate structure 174. The intrusion beam structure 110 further comprises means for mounting the elongated member 140 to a door frame 14.

The elongated member 118 includes first and second end portions 176, 178 interdisposed between a middle portion 180. The first and second end portions 176, 178 each taper away from the middle portion 180. In this regard, throughout the first and second end portions 176, 178, the first and second bar portions 170, 172 gradually approach one another as the distance from the middle portion 180 increases. Throughout the first and second portions 176, 178 the intermediate structure 174 correspondingly tapers.

In the exemplary embodiment shown, the intermediate structure 174 is an aluminum casting. Preferably, the intermediate structure 174 is formed to include an aperture 182 extending lengthwise therethrough, the first bar portion 170 being disposed therein. The second bar portion 172 is welded or bonded to a bottom surface 184 of the intermediate structure 174.

The elongated member 140 is designed such that the first bar portion 170 is positioned adjacent to the outer panel 24 and the second bar portion 172 is positioned adjacent the inner panel 16. In this manner, upon lateral impact, the first bar portion 170 is best suited to withstand compressive forces, while the second bar portion 172 is best suited to withstand tensile forces.

As illustrated, the first bar portion 170 has a greater width W than the width w of the second bar portion 172. It should be appreciated that particular design requirements may necessitate the second bar portion 172 being equal in width to the first bar portion 170, or that the width of the second bar portion 172 be greater than that of the first bar portion 170. Further, the width of either bar portion 170, 172 may vary along its respective length.

As illustrated, the intermediate structure 174 of the second preferred embodiment is an aluminum casting. However, it will be appreciated by those skilled in the art that many other suitable structures can be incorporated. In this regard, the intermediate structure 174 can be in the form of a metal truss (not shown). Also, the intermediate structure 174 could be in the form of corrugated steel, or other compatible metal.

The means for mounting the elongated member 112 of the second embodiment to the door frame 14 comprises first and second mounting portions 186, 188 having first and second planar surfaces 190, 192, respectively. Each planar surface 190, 192 is disposed substantially parallel to the elongated member 140 and is adapted to mount to a surface substantially parallel to the elongated member 140. Preferably, the mounting portions 186, 188 comprise a metal sheet 194 welded, or otherwise suitably fastened, in between the first and second bar portions 170, 172. The mounting portions 186, 188 are adapted to be welded, bolted or otherwise suitably fastened, to an inner panel 16 of the door frame 14. In the exemplary embodiment illustrated, the planar surfaces 190, 192 include apertures 196 through which bolts (not shown) may pass to assist in attaching the elongated member 140 to the frame 14.

The foregoing discussion disclose and describes merely exemplary embodiments of the present invention. One skilled in the art will readily recognize from such discussion, and from the accompanying drawings and claims, that various changes, modifications and variations can be made therein without departing from the true spirit and fair scope of the invention as defined in the following claims.

What is claimed:

1. A door structure for a vehicle comprising:
a door frame including first and second downwardly extending legs interconnected by an inner panel, said first leg extending along the front edge of said door frame and said second leg extending along the rear edge of said door frame, said first and second legs include first and second dependent walls, respectively, said first and second dependent walls being substantially parallel to said inner panel;
an elongated member having first and second end portions interdisposed between a middle portion, said first and second end portions each tapering away from said middle portion, said elongated member being attached directly to at least one of said first and second dependent walls; and
means for mounting said elongated member to a surface of said door frame substantially parallel to said inner panel.

2. The door structure of claim 1, further comprising a bracket member interconnecting said elongated member and said frame.

3. The door structure of claim 2, wherein said elongated member is unitarily formed.

4. The door structure of claim 3, wherein said means for mounting the elongated member to the door frame is unitarily formed with the elongated member.

5. The door structure of claim 1, wherein said means for mounting said elongated member to said door frame comprises first and second mounting portions having first and second substantially planar surfaces, respectively, each planar surface being disposed substantially parallel to said elongated member, said first and second planar surfaces being adapted to mount to a surface of said door frame substantially parallel to said elongated member.

6. An intrusion beam structure for a vehicle door having a door frame, the intrusion beam structure comprising:
an elongated member having first and second bar portions traversing substantially the entire length of said elongated member and being disposed substantially parallel to each other for a substantial portion thereof;
an intermediate structure interconnecting said first and second bar portions; and
means for mounting said elongated member to said door frame.

7. The intrusion beam structure of claim 6, wherein said elongated member includes first and second end portions interdisposed between a middle portion, said first and second end portions each tapering away from said middle portion.

8. The intrusion beam structure of claim 7, wherein said intermediate structure includes an aperture extending lengthwise therethrough, said first bar portion being disposed therein.

9. The intrusion beam structure of claim 8, wherein said first bar portion has a first width and the second bar portion has a second width, said first being greater than said second width.

10. The intrusion beam structure of claim 7, wherein said middle portion has a constant cross section.

11. The intrusion beam structure of claim 6, wherein said means for mounting said elongated member to said door frame comprises first and second mounting portions having first and second planar surfaces, respectively, each planar surface being disposed substantially parallel to said elongated member, said first and second planar surfaces being adapted to mount directly to said door frame.

12. The intrusion beam structure of claim 11, wherein each mounting portion includes a piece of sheet metal disposed between and permanently attached to said first and second bar portions.

13. An intrusion beam structure for reinforcing a vehicle door having a door frame, the intrusion beam structure comprising:
an elongated member defining an axis, said elongated member having a substantially circular cross section, a substantially uniform outer diameter, and first and second end portions interconnected to said middle portion through first and second intermediate portions, respectively, said first and second intermediate portions each tapering away from said middle portion; and
means for mounting said elongated member to said door frame.

14. The intrusion beam structure of claim 13 wherein said middle portion comprises a hollow tubular member.

15. The intrusion beam structure of claim 14 wherein said first and second intermediate portions are each hollow and include an inner diameter and an outer diameter, and further wherein said outer diameter varies independently from said inner diameter.

16. The intrusion beam structure of claim 15, wherein said elongated member is unitarily formed.

17. The intrusion beam structure of claim 13, wherein said means for mounting said elongated member to said door frame comprises first and second mounting portions having first and second substantially planar surfaces, respectively, each planar surface being disposed substantially parallel to an axis defined by said middle portion, said first and second planar surfaces being adapted to mount to a surface substantially parallel to said middle portion.

* * * * *